(12) United States Patent
Sauer

(10) Patent No.: US 11,780,747 B2
(45) Date of Patent: Oct. 10, 2023

(54) FILTER DEVICE PARTICULARLY FILTER CARTRIDGE FOR WATER FILTERS IN AIRCRAFT

(71) Applicant: AQUA FREE GMBH, Hamburg (DE)

(72) Inventor: Matthias Sauer, Hamburg (DE)

(73) Assignee: AQUA FREE GMBH, Hamburg (DE)

( * ) Notice: Subject to any disclaimer, the term of this patent is extended or adjusted under 35 U.S.C. 154(b) by 0 days.

(21) Appl. No.: 17/046,349

(22) PCT Filed: Apr. 9, 2019

(86) PCT No.: PCT/EP2019/058920
§ 371 (c)(1),
(2) Date: Oct. 9, 2020

(87) PCT Pub. No.: WO2019/197388
PCT Pub. Date: Oct. 17, 2019

(65) Prior Publication Data
US 2021/0155505 A1    May 27, 2021

(30) Foreign Application Priority Data
Apr. 10, 2018  (DE) ............... 20 2018 101 926.0

(51) Int. Cl.
*C02F 1/28* (2023.01)
*C02F 1/44* (2023.01)

(52) U.S. Cl.
CPC .............. *C02F 1/283* (2013.01); *C02F 1/444* (2013.01); *C02F 2201/001* (2013.01);
(Continued)

(58) Field of Classification Search
CPC ........ B01D 2201/291; B01D 2201/347; B01D 29/58; B64D 11/02; B64D 11/04;
(Continued)

(56) References Cited

U.S. PATENT DOCUMENTS 4,909,937 A    3/1990  Hoffmann et al.
6,641,717 B2*  11/2003 Okano ................. B01D 29/603
                                                        210/93
(Continued)

FOREIGN PATENT DOCUMENTS

DE       10196530 B4    3/2015
WO     2014077414 A1    5/2014

OTHER PUBLICATIONS

English Translation of WO 2014/077414 A1 provided from FIT database in Search. (Year: 2014).*
(Continued)

*Primary Examiner* — Terry K Cecil
(74) *Attorney, Agent, or Firm* — Grogan, Tuccillo & Vanderleeden, LLP

(57) ABSTRACT

The invention relates to a filter device (100), particularly a filter cartridge (10), for water filters in aircraft comprising a housing (11), wherein the housing (11) comprises an entry region (12) for water to be filtered and a discharge region (24) for filtered water, and wherein a first filter unit (26) and a second filter unit (27) are arranged in the housing (11). The first filter unit (26) comprises an activated charcoal filter (28) and the second filter unit (27) comprises a microfilter (30).

17 Claims, 4 Drawing Sheets

(52) U.S. Cl.
CPC .. *C02F 2201/003* (2013.01); *C02F 2201/006* (2013.01); *C02F 2307/00* (2013.01)

(58) Field of Classification Search
CPC .... C02F 1/283; C02F 1/444; C02F 2201/001; C02F 2201/003; C02F 2201/006; C02F 2307/00

See application file for complete search history.

(56) References Cited

U.S. PATENT DOCUMENTS

| | | | |
|---|---|---|---|
| 10,399,021 B2* | 9/2019 | Cai | B01D 63/10 |
| 2003/0222013 A1* | 12/2003 | Yang | B01D 35/04 |
| | | | 210/435 |
| 2005/0067340 A1 | 3/2005 | Broens et al. | |
| 2014/0263054 A1* | 9/2014 | Julos | C02F 1/001 |
| | | | 210/287 |
| 2016/0361673 A1 | 12/2016 | Cai et al. | |

OTHER PUBLICATIONS

International Search Report dated Jul. 3, 2019 from the corresponding PCT Application No. PCT/EP2019/058920.
European Office Action dated Feb. 9, 2023 from corresponding EPO Application No. 19 717 466.7-1101.

\* cited by examiner

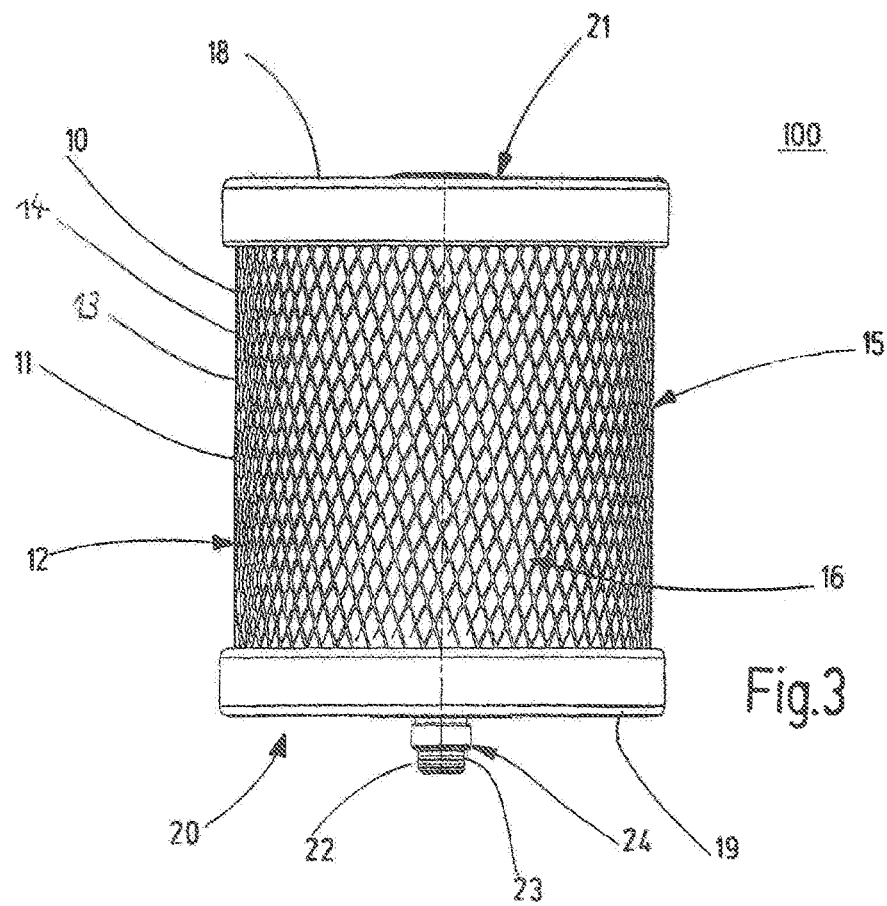
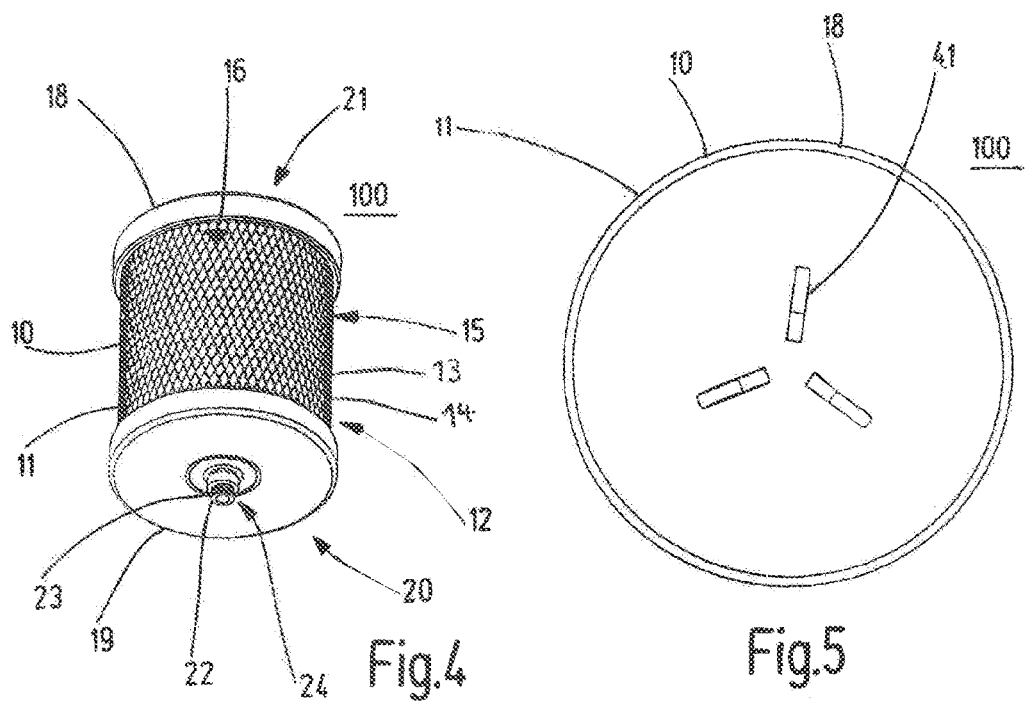

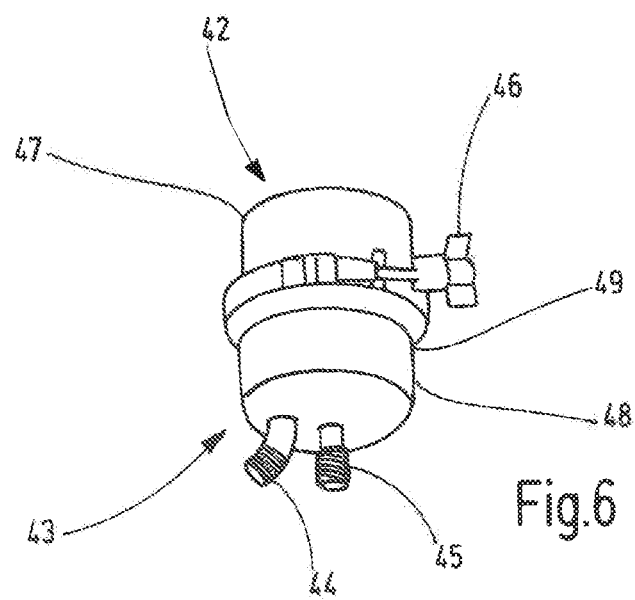
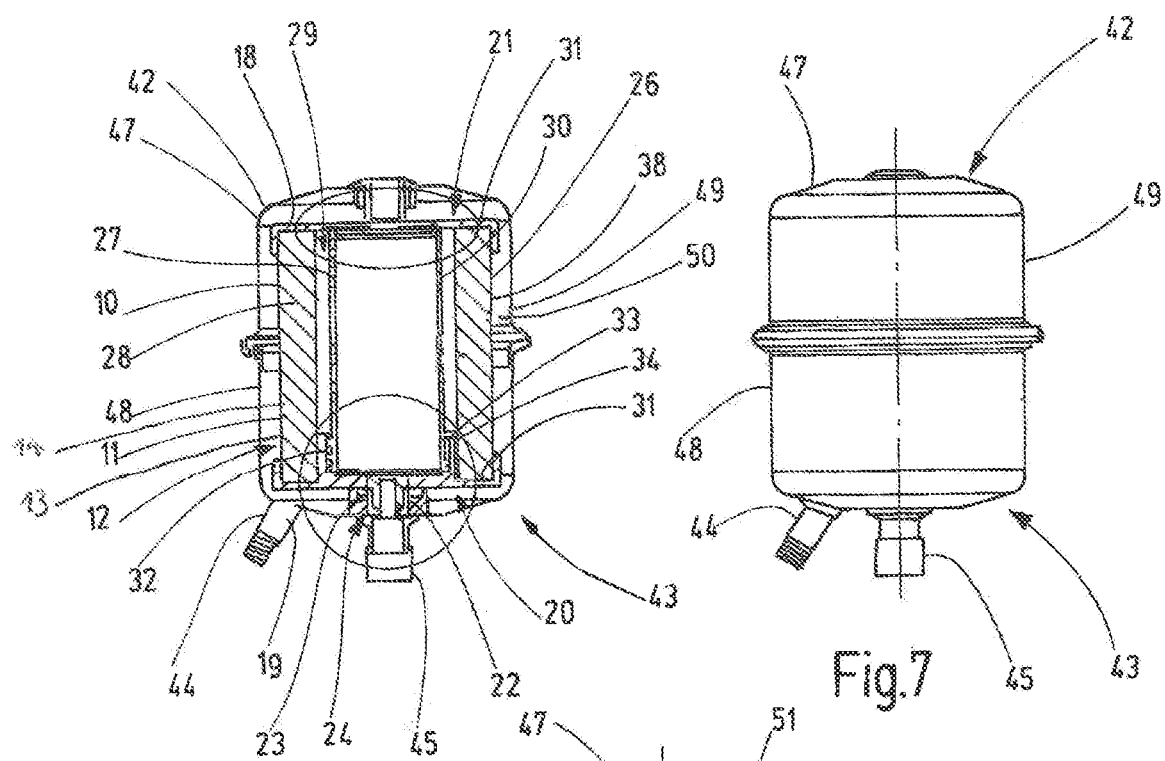
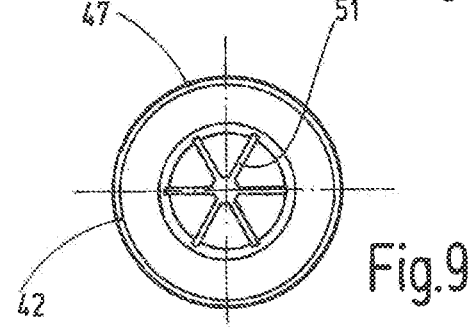

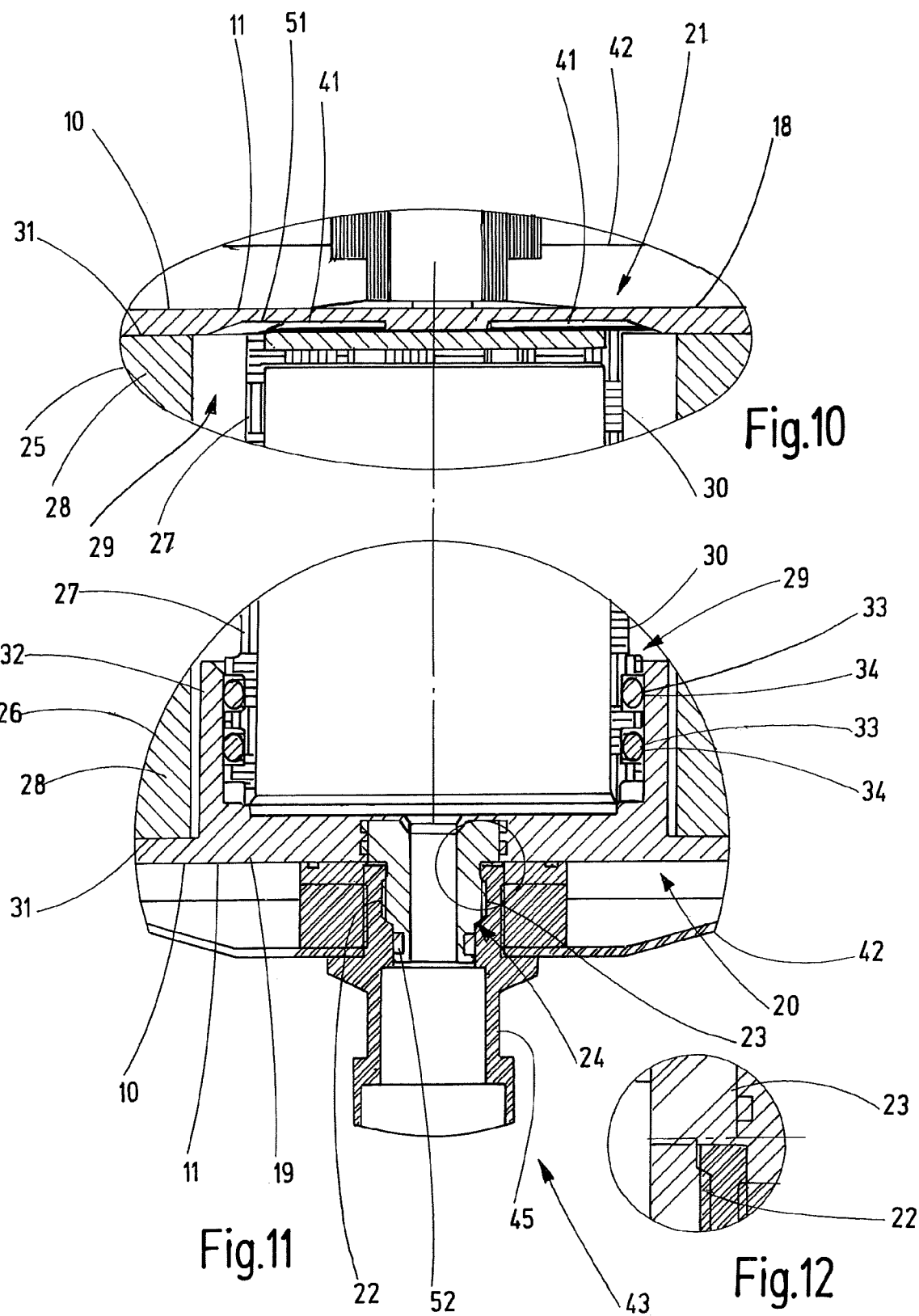

FILTER DEVICE PARTICULARLY FILTER CARTRIDGE FOR WATER FILTERS IN AIRCRAFT

CROSS REFERENCE TO RELATED APPLICATION

This application in a national stage of International Patent Application No. PCT/EP2018/058920 filed on Apr. 9, 2019, which claims priority to German Patent Application No. 202018101926.0 filed on Apr. 10, 2018, both of which are hereby incorporated by reference in their entireties.

FIELD OF THE INVENTION

The present invention relates to a filter device, particularly a filter cartridge, for water filters in aircraft, comprising a housing, wherein the housing comprises an entry region for water that is to be filtered and a discharge region for filtered water. Furthermore, the present invention relates to a filter container, comprising a water inlet and a water outlet in a lower region of the filter container, a water filter in an aircraft, and a method for the filtering of water in an aircraft.

TECHNOLOGICAL BACKGROUND

Due to the strict hygiene regulations in the aviation industry, water filters used in aircraft, particularly in passenger aircraft, must meet high standards. Such water filters must particularly be designed to provide bacteria- or germ-free water, and to prevent the formation of biofilms in the water system of the aircraft. In the case water filters or filter devices for water filters of known art, inadequate filtering of the water can lead to the need for long disinfection phases, during which the aircraft, particularly the aeroplane, cannot be used.

One reason for a lack of hygiene in an aircraft can be water filters, or filter devices, in which water remains in the water filter, or the filter device, during a replacement of the filter device. This standing water is a source of bacteria, or biofilms, or other unhygienic substances. During the replacement of the filter device, the water remaining in the filter device may leak out of the filter container of the aircraft water filter, and contaminate the environment of the water filter, so that an intensive cleaning of the environment of the water filter must be carried out.

SUMMARY OF THE INVENTION: OBJECT, SOLUTION, ADVANTAGES

It is therefore the object of the present invention to provide a filter device, particularly a filter cartridge, for water filters in aircraft, with which a water filtration that meets the strict hygienic requirements in the aviation industry is made possible, and by means of which the risk of contamination of the environment of the water filter, particularly of an interior space of the aircraft, is reduced, particularly when the filter device is replaced. Furthermore, it is the object of the present invention to provide a filter container for a water filter, a water filter in an aircraft, and a method for filtering water in an aircraft, with which the aforementioned advantages are achieved.

In order to achieve the object underlying the invention, a filter device, particularly a filter cartridge for water filters in aircraft, is proposed, comprising a housing, wherein the housing comprises an entry region for water that is to be filtered and a discharge region for filtered water, wherein a first filter unit and a second filter unit are arranged in the housing, wherein the first filter unit comprises an activated carbon filter and the second filter unit comprises a microfilter.

By means of the inventive water filter it is possible to filter water in an aircraft that is free of bacteria and germs, and to prevent the formation of biofilms. In particular by the combination of a first filter unit with a second filter unit in one housing, wherein the first filter unit comprises an activated carbon filter, and whereby the second filter unit comprises a micro filter, a particularly space-saving and hygienic filtering of water in an aircraft is made possible. In particular by this means the necessary disinfection intervals can be increased from three to four to six months, and the costs for chemical and laboratory tests can be reduced. By the combination of a first filter unit, comprising an activated carbon filter, and a second filter unit, comprising a microfilter, all bacteria and microbes as well as chlorine, odours, heavy metals and other chemicals can be filtered out of the aircraft water system.

Provision can preferably be made that the filter device can be arranged, and/or is arranged, in a filter container, preferably approved for use in aircraft, particularly in passenger aircraft, and/or that the filter device is designed such that, in a state in which the filter device is arranged in a filter container, there is no reservoir of water within the filter device, so that the filter device can be removed from the filter container without contamination of an external region of the filter container.

The filter container, approved for use in aircraft, houses the filter device. In the operating state the filter container, and the filter device arranged therein, are arranged and designed such that no standing water reservoir is formed inside the filter container, or inside the filter device. This makes it possible to remove the filter device from the filter container without having to pay special attention to any standing water remaining in the filter device. This measure can reduce the risk of contamination of the environment external to the filter container, or an interior space of the aircraft.

This advantage is preferably achieved by the fact that water that is to be filtered enters the filter container and/or the filter device in a lower region, or from below, and that the filtered water exits the filter container, and/or the filter device, from a lower region, that is to say, from below.

The entry and exit of the water that is to be filtered, or the filtered water, in the lower region, that is to say, from below the filter container and/or the filter device ensures that no standing water reservoir is formed in the filter container, and/or in the filter device.

Furthermore, provision is preferably made that the entry region has a grid structure, through which water can enter the filter device.

The grid structure can preferably consist of a honeycomb structure, so as to increase the stability, wherein pores, or passages, or passage openings, are arranged within, or in the interior of, the individual honeycombs.

Furthermore, provision can be made that the housing is essentially cylindrical in shape, with a lateral surface, and a first end face and a second end face, and/or that the entry region is located in a lateral surface of the housing.

The filter device is preferably cylindrical in design and has a first and a second end face. In a circumferential direction, the housing has an outer wall, which corresponds to a lateral surface of the cylindrical shape.

The second filter unit, that is to say, the microfilter of the second filter unit, is preferably designed as a hollow fibre microfilter membrane.

Sterile water can be provided by the second filter unit, particularly by the microfilter.

It is a particular advantage for the filter container approved for use in aircraft to be a certified filter container.

By virtue of the possibility of inserting the filter device into a filter container that is approved for operation in aircraft, the filter device can be used in water filters for aircraft that are already available and approved.

With particular advantage, provision can be made that the housing and/or the first filter unit has a diameter of between 50 mm and 100 mm, preferably of between 70 mm and 90 mm, more preferably of between 80 mm and 90 mm, particularly preferably of between 85 and 87 mm, most preferably of 86 mm.

Furthermore, provision can preferably be made that the first filter unit has an inner diameter of between 20 mm and 80 mm, preferably of between 30 mm and 60 mm, more preferably of between 57 mm and 59 mm, most preferably of 58 mm.

In particular, provision can preferably be made that the first filter unit has a height of between 50 mm and 150 mm, preferably of between 80 mm and 120 mm, more preferably of between 100 mm and 110 mm, particularly preferably of between 105 mm and 106 mm, most preferably of 105.5 mm.

Provision can preferably be made that the housing has a height of between 50 mm and 150 mm, preferably of between 100 mm and 140 mm, more preferably of between 110 mm and 130 mm, particularly preferably of between 120 and 130 mm, most preferably of 124.2 mm.

Furthermore, provision can preferably be made that the housing comprises a cover and a base, wherein the discharge region is arranged in the base, and/or wherein the cover and/or the base are arranged on the first and/or the second end face, and are preferably adhesively bonded to the first filter unit.

The arrangement of the discharge region in the base ensures that water from the interior of the filter device, and/or from the filter container, comprising the filter device can always drain off, so that no standing water reservoir is formed in the filter container, or in the filter device.

With further advantage, provision can be made that the base has an, particularly cylindrical, reception region in which the second filter unit is arranged, wherein sealing means, particularly sealing rings, are preferably arranged between the second filter unit and the reception region.

The cylindrical reception region can be designed such that a lower region of the second filter unit is screwed or pressed into the cylindrical reception region. The sealing means prevent water from flowing past the microfilter of the second filter unit to the discharge region. The discharge region is preferably located centrally in the base, and particularly centrally in the reception region.

Provision is preferably made that the first end face is a lower end face of the housing, and/or that the discharge region is arranged in the first end face, wherein the discharge region preferably comprises, or is, an outflow pipe connection, particularly one that is provided with an external thread.

By the provision of an external thread on the outflow pipe connection, the outflow pipe connection can easily be connected to a water outlet of a filter container of known art. When the filter device is particularly arranged in such a housing, a liquid-tight connection can be provided by the connection of the externally-threaded outflow pipe connection with the water outlet.

Furthermore, provision can be made that the microfilter has a multiplicity of pores, wherein the pores have a size between 0.001 µm and 1.0 µm, preferably between 0.01 µm and 0.5 µm, more preferably between 0.1 µm and 0.3 µm, particularly preferably between 0.15 µm and 0.25 µm, most preferably of 0.2 µm.

With the pore size selected in this way, the pores of the microfilter are smaller than all known water-borne bacteria. Therefore bacteria and germs cannot pass through the second filter unit. In particular, undesirable effects, such as the escape of bacteria from an activated carbon filter, can be prevented.

Furthermore, provision is preferably made that the first filter unit encloses the second filter unit at least partially, preferably completely, in a circumferential direction, wherein the first filter unit is preferably designed in the form of a hollow cylinder, wherein furthermore the second filter unit is preferably designed in the form of a hollow cylinder, and wherein the second filter unit is arranged in an inner region, or an inner space, of the first filter unit.

With further advantage, provision can be made that the filter device is designed such that the water that is to be filtered can flow in one flow direction through the entry region, through the first filter unit, through the second filter unit and through the discharge region, in this order, and/or vice versa.

In particular, provision is preferably made that a third filter unit is arranged between the first filter unit and the second filter unit, wherein the third filter unit preferably has a multiplicity of pores or grid openings, wherein the pores and/or the grid openings of the third filter unit have a diameter of between 50 µm and 200 µm, preferably of between 75 µm and 125 µm, particularly preferably of 100 µm.

With particular advantage, provision can be made that a protective mesh and/or a protective grid is arranged on an outer face and/or an inner face of the first filter unit, wherein the protective mesh and/or the protective grid is designed such that an escape of activated carbon particles from the first filter unit can be prevented, and/or is prevented.

By provision of the safety mesh and/or the protective grid, it is possible to prevent activated carbon particles from escaping from the first filter unit and being carried towards the second filter unit by the water that is to be filtered and clogging the second filter unit.

With advantage, provision can be made that the activated carbon filter consists of, or comprises, acid-washed coconut shell.

The filter device preferably makes it possible to achieve a retention equivalent of bacteria (*Brevundimonas diminuta*) of LRV (Log Reduction Value)>7 per $cm^2$ of filter surface.

The filter device is preferably designed for a flow volume of approx. 12,700 litres at 5 litres/min, corresponding to approx. 3,350 US liquid gallons at 1.32 gallons/min.

Furthermore, provision can be made that the flow rate is 10 litres/min at 5, and/or 4 litres/min at 72.5 psi/min.

The filter device is preferably designed for a maximum operating pressure of 5 bar or 72.5 psi, and/or a maximum operating temperature of 40 C.

The activated carbon filter of the first filter unit preferably has a pore size of between 0.001 µm and 2.0 µm, preferably of between 0.01 µm and 1.0 µm, more preferably of between 0.3 µm and 0.7 µm, particularly preferably of between 0.4 µm and 0.6 µm, most preferably of 0.5 µm.

A further inventive solution consists in the provision of a filter container with a water inlet and a water outlet, wherein the water inlet and the water outlet are arranged in a lower region, preferably on a lower face, of the filter container, characterised in that a prescribed filter device is arranged in an inner space of the filter container.

By means of the water inlet and outlet located on the base or in the lower region of the filter container, in combination with the filter device arranged inside the filter container, a particularly effective water filtration in an aircraft can be enabled. In particular, the particular arrangement of water outlet and water inlet and the corresponding configuration of the filter device ensures that no standing water reservoir is formed in the filter container, or in the filter device arranged in the filter container.

This prevents contamination of the environment external to the filter container when changing the filter device.

With particular advantage, provision can be made that the water outlet is connected to the discharge region, particularly the outflow pipe connection, of the filter device.

Furthermore, provision can advantageously be made that an intermediate space, particularly a circumferential intermediate space, is arranged between an outer wall of the filter container and the housing of the filter device, so that water entering through the water inlet can enter the intermediate space at least partially surrounding the filter device, and can then enter the filter device through the entry region of the filter device.

With further advantage, provision can be made that the filter container is designed in two parts.

A further solution of the object underlying the invention consists in the provision of a water filter in an aircraft, particularly in an aeroplane, comprising a prescribed filter device, and/or comprising a prescribed filter container.

Furthermore, one solution of the object underlying the invention consists in the provision of a method for the filtration of water in an aircraft, particularly in an aeroplane, using a prescribed filter container, wherein water that is to be filtered is introduced through a water inlet into a lower region of the filter container, wherein the water is passed through an activated carbon filter and then through a microfilter, and wherein the filtered water exits through a water outlet in a lower region of the filter container.

BRIEF DESCRIPTION OF THE FIGURES

The invention is explained in more detail below, with the aid of the figures. Here:

FIG. 3 shows a side view of a filter device,
FIG. 4 shows a further view in perspective of a filter device,
FIG. 5 shows a plan view onto a filter device,
FIG. 6 shows a filter container,
FIG. 7 shows a side view of a filter container,
FIG. 8 shows a cross-section of a filter container with a filter device,
FIG. 9 shows an internal view of an upper part of a filter container,
FIG. 10 shows a detail of an upper part of a filter container with a filter device,
FIG. 11 shows a detail of a lower part of a filter container with a filter device,
and
FIG. 12 shows a further detail of a lower part of a filter container with a filter device.

DETAILED DESCRIPTION OF THE FIGURES

Figure 1:
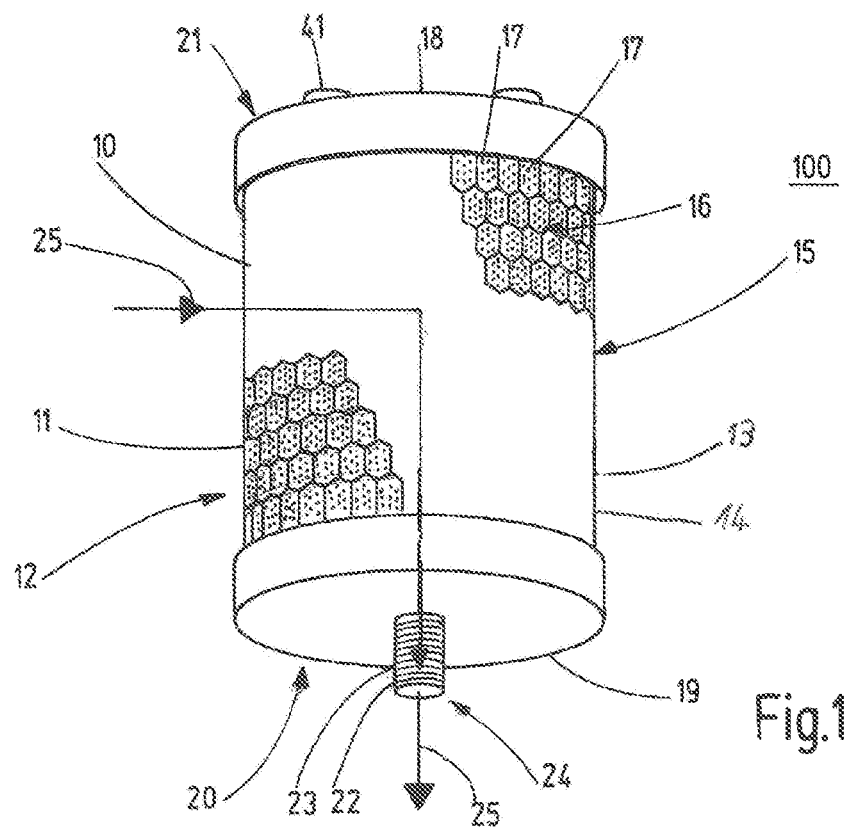
FIG. 1 shows a view in perspective of a filter device.

FIG. 1 shows a filter device 100, which is designed as a filter cartridge 10. The filter device 100 is designed for use in water filters in aircraft, particularly aeroplanes. The filter device 100 comprises a housing 11, wherein an entry region 12 is arranged in an outer wall 13, that is to say, in a lateral surface 14, of the housing 11. The entry region 12 comprises a grid structure 15, which in turn consists of the superposition of honeycombs 16, and passage openings 17 arranged in the honeycombs 16. The filter device 100 further comprises a base 19 on a first end face 20 and a cover 18 on a second end face 21. Centrally in the base 19 is arranged a discharge region 24 in the form of an outflow pipe connection 22. The outflow pipe connection 22 has an external thread 23.

The flow direction of the water that is to be filtered is marked with the arrow 25. The water that is to be filtered enters the filter device 100 through the entry region 12, passes through a first filter unit 26 arranged in the housing 11, and a second filter unit 27, as shown in FIG. 2, and exits through the outflow pipe connection 22.

Figure 2:
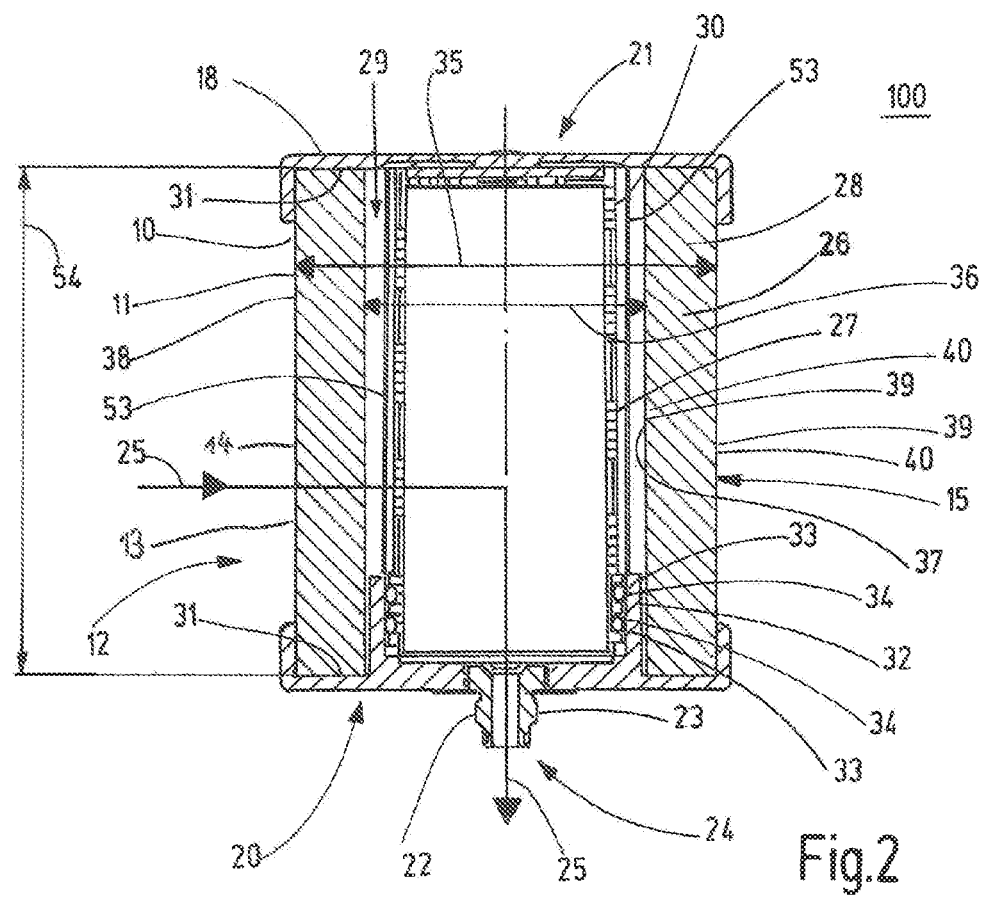
FIG. 2 shows a cross-sectional view of a filter device.

FIG. 2 shows a cross-sectional view through the filter device 100. In the housing 11 is arranged a first filter unit 26, particularly of cylindrical design. The first filter unit 26 comprises an activated carbon filter 28. In an inner space 29 of the first filter unit 26 is arranged a second filter unit 27, which comprises a micro filter 30. The base 19 and the cover 18 of the filter unit 100 are attached on the lower, first end face 20 and the upper, second end face 21 of the housing 11, and are adhesively bonded to the first filter unit 26 at adhesive bonding points 31. The base 19 of the filter device 100 has a discharge region 24 designed as an outflow pipe connection 22, which is centrally arranged in the base 19. Furthermore, the base 19 has a reception region 32 for the second filter unit 27. The second filter unit 27 can be screwed or pressed into the reception region 32. Furthermore, sealing means 33, for example sealing rings 34, are provided between the reception region 32 and the second filter unit 27. The reception region 32 is also of cylindrical design. The diameter 35 of the housing 11 is 86 mm. The inner diameter 36 of the first filter unit 26 is 58 mm. A protective grid 39 or a protective mesh 40 is arranged on the inner face 37 and the outer face 38 of the first filter unit 26, particularly between the grid structure 15 and the first filter unit 26; this is designed such that an escape of particles of the activated carbon filter 28 is prevented. This measure prevents the microfilter 30 of the second filter unit 27 from clogging.

A side view of the filter device 100 is shown in FIG. 3.

FIG. 4 shows a view in perspective of the filter unit 100, and FIG. 5 is a plan view onto the cover 18 of the filter unit 100. The cover 18 has alignment ribs 41.

FIGS. 6 and 7 show an example of a filter container 42. The filter container 42 has a water inlet 44 and a water outlet 45 in the lower region 43. The filter container 42 can be opened by way of a security mechanism 46, so that a filter device 100 (FIG. 8) arranged inside the filter container 42 can be removed.

FIG. 8 shows a cross-section through the filter container 42 of FIGS. 6 and 7. Inside the filter container 42 is arranged a filter device 100 according to one of the FIGS. 1 to 5. The filter container 42 is designed in two parts and has an upper part 47 and a lower part 48. An intermediate space 50 is formed between the outer face 38 of the filter device 100, particularly between the grid structure 15, and the outer wall 49 of the filter container 42. This allows water that is to be filtered to enter into the filter container 42 from below, through the water inlet 44. The water then flows from the outside, through the grid structure 15, through the activated carbon filter 28, through the microfilter 30, and through the outflow pipe connection 22, and the water outlet 45 of the filter container 42. By virtue of the entry and exit of the water that is to be filtered, or the filtered water, into and out of the filter container 42, or more particularly, the filter device 100, in the lower region 43, it is always possible to ensure that the water runs out of the filter container 42 and the filter device 100, and thus no standing water reservoir is formed inside the filter container 42 or the filter device 100.

FIG. 9 shows a view onto the inner face of the upper part 47 of the filter container 42 with alignment grooves 51, with which the alignment ribs 41 of the cover 18 of the filter device 100 can engage, as shown in the detailed drawing of FIG. 10.

FIGS. 10 to 12 show details of the filter container 42 with the filter device 100 from FIG. 8. In particular, it can be seen in FIG. 11 how the discharge region 24 of the filter device 100, designed as an outflow pipe connection 22, is connected to the water outlet 45 of the filter container 42 by way of an external thread 22 and a sealing ring 52.

Returning to FIG. 2, it is shown there that both the housing 11 of the filter device 100 and the first filter unit 26 and the second filter unit 27 are essentially of cylindrical design, and are arranged concentrically relative to one another. In a non-obligatory form of embodiment, a third filter unit 53, which has a multiplicity of pores or grid openings, can be arranged between the first filter unit 26 and the second filter unit 27. A further filter stage can be implemented with the third filter unit 53.

The height 54 of the first filter unit 26 is 105.5 mm.

The invention claimed is:

1. A filter device for water filters in aircraft, comprising a housing, wherein the housing comprises an entry region for water that is to be filtered, and a discharge region for filtered water, wherein a first filter unit and a second filter unit are arranged in the housing, wherein the first filter unit is an activated carbon filter, and wherein the second filter unit is a microfilter, wherein the first filter unit encloses the second filter unit in a circumferential direction, wherein the first filter unit is designed in the form of a hollow cylinder, wherein the second filter unit is arranged in an inner space of the first filter unit, wherein the second filter unit is designed in the form of a hollow cylinder, and that the filter device is designed such that water that is to be filtered can flow radially in a flow direction through the entry region, radially through the first filter unit, radially through the second filter unit and through the discharge region, in this order, wherein the entry region has a grid structure through which water can enter into the filter device, the grid structure including a honeycomb structure so as to increase stability, the grid structure being a superposition of honeycombs and pores, passages, and/or passage openings, each honeycomb including a plurality of the pores, passages, or passage openings arranged within or in the interior thereof.

2. The filter device according to claim 1, characterised in that the filter device can be arranged in a filter container approved for use in aircraft, wherein the filter device is designed such that in a state in which the filter device is arranged in a filter container, there is no reservoir of water within the filter device, so that the filter device can be removed from the filter container without contamination of an external region of the filter container.

3. The filter device according to claim 1, characterised in that the housing is essentially cylindrical in shape, with a lateral surface, and a first end face, and a second end face, and in that the entry region is arranged in a lateral surface of the housing.

4. The filter device according to claim 3, characterised in that the housing comprises a cover and a base, wherein the discharge region is arranged in the base, wherein the cover and the base are arranged on the first and the second end face, respectively and are adhesively bonded to the first filter unit, wherein the base has a cylindrical reception region, in which the second filter unit is arranged, wherein sealing rings are arranged between the second filter unit and the reception region.

5. The filter device according to claim 3, characterised in that the first end face is a lower end face of the housing and that the discharge region is arranged in the first end face, wherein the discharge region comprises an outflow pipe connection.

6. The filter device according to claim 1, characterised in that the housing, and/or the first filter unit, has a diameter of between 50 mm and 100 mm, and/or that the first filter unit has an inner diameter of between 20 mm and 80 mm.

7. The filter device according to claim 1, characterised in that the first filter unit has a height of between 50 mm and 150 mm, and/or that the housing has a height of between 100 mm and 140 mm.

8. The filter device according to claim 1, characterised in that the microfilter has a multiplicity of pores, wherein the pores have a size of between 0.001 μm and 1.0 μm.

9. The filter device according to claim 1, characterised in that a third filter unit is arranged between the first filter unit and the second filter unit, wherein the third filter unit comprises a multiplicity of pores or grid openings, wherein the pores or the grid openings of the third filter unit have a diameter of between 50 μm and 200 μm.

10. The filter device according to claim 1, characterised in that a protective mesh or a protective grid is arranged on an outer face and an inner face of the first filter unit, wherein the protective mesh or the protective grid is designed such that an escape of activated carbon particles from the first filter unit is prevented.

11. The filter device according to claim 1, characterised in that the activated carbon filter comprises acid-washed coconut shell and/or that the activated carbon filter of the first filter unit has a pore size of between 0.01 μm and 1.0 μm.

12. A water filter in an aircraft, comprising a filter device according to claim 1.

13. A filter container with a water inlet and a water outlet, wherein the water inlet and the water outlet are arranged in a lower region of the filter container, characterised in that a filter device according to claim 1 is arranged in an inner space of the filter container.

14. The filter container according to claim 13, characterised in that the water outlet is connected to the discharge region.

15. The filter container according to claim 13, characterised in that between an outer wall of the filter container and the housing of the filter device a circumferential intermediate space is arranged, so that water entering through the water inlet can enter into the intermediate space, at least partially surrounding the filter device, and can enter into the filter device through the entry region of the filter device.

16. The filter container according to claim 13, characterised in that the filter container is designed in two parts.

17. A method for filtering water in an aircraft, using a filter container according to claim 13, characterised in that water that is to be filtered is introduced into the lower region of the filter container through the water inlet, in that the water is passed through the activated carbon filter, and then through the microfilter, and in that the filtered water exits through the water outlet in the lower part of the filter container.

\* \* \* \* \*